Figure 1:
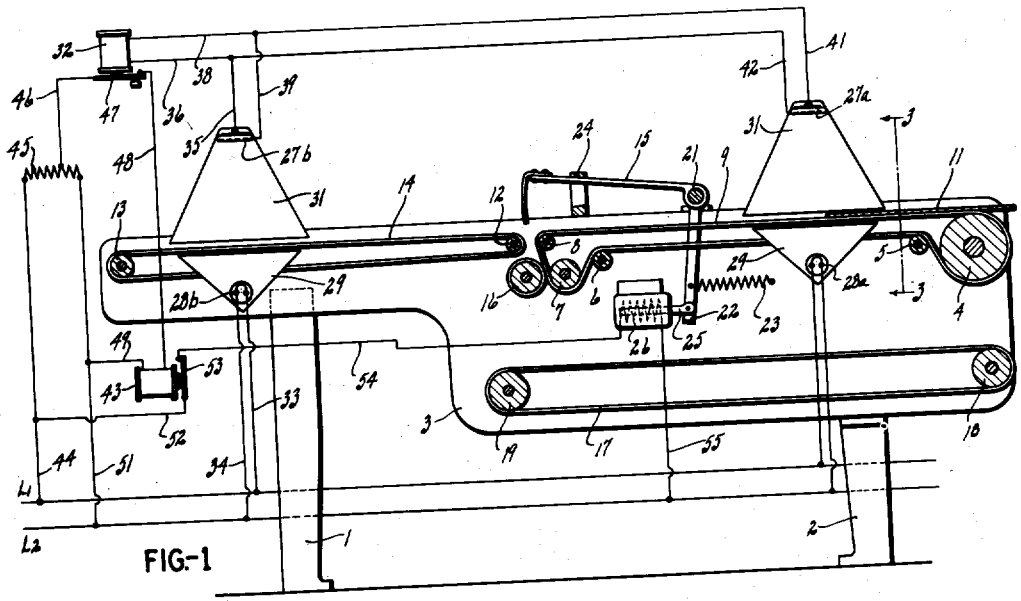

March 9, 1937.  W. P. BEATTIE  2,072,937
ELECTRICAL MEASURING MEANS
Filed April 16, 1934

INVENTOR
WILLIAM P. BEATTIE
BY Brockett, Hyde, Higley & Meyer
ATTORNEYS

Patented Mar. 9, 1937

2,072,937

UNITED STATES PATENT OFFICE 2,072,937

ELECTRICAL MEASURING MEANS

William P. Beattie, Norwood, Ohio, assignor to The American Laundry Machinery Company, Norwood, Ohio, a corporation of Ohio Application April 16, 1934, Serial No. 720,838

8 Claims. (Cl. 270—80).

This invention relates to electrical measuring means for determining folding points and the like and, more particularly, to an apparatus for folding flat articles utilizing photo-electric means for positioning such articles.

The invention comprises a machine having traveling conveyor tapes and a folding blade which engages a sheet or other flat foldable article while the same is on the conveyor tapes and thrusts it between folding rollers to impart a desired fold or folds. It is, of course, essential that the fold be properly located, usually centrally of the length of the article, and the present invention provides means of the nature of photoelectric cells in pairs so positioned that the light from a light source impinging on the photoelectric cells is intercepted by the traveling article and an electrical system, controlling the folding blade and sensitive to the amount of light reaching the cells, may be balanced or unbalanced and thus actuate the blade.

Folding machines, such as those devised for folding laundry flatwork, have heretofore been equipped with elaborate and complex timing means for insuring that the folding blade will perform its function at the moment when the laundered article has traveled to the proper position for folding the article along the fold line desired, this fold line being selected with respect to the length of the article, which may be variable. The present apparatus aims to do away with such complex timing arrangements and the elaborate interconnecting mechanism necessary to synchronize the operation of folding blades with the speed of the conveying means and to make it possible to fold articles of varying lengths without the necessity of adjusting the machine for each length of article which may be passed therethrough. The means for effecting this result may also be used for measuring other articles presenting a more or less flat area and is not limited to the measurement of lengths since adaptations thereof may be devised to measure widths or to measure both length and width simultaneously.

It is, accordingly, an object of the present invention to provide a measuring means characterized by the interception of light beams for quickly and accurately determining the measurements of a substantially flat article. Another object of the invention is to provide a simple and accurate means for determining lines of fold without the use of complex and cumbersome timing devices.

A further object of the invention is to provide a folding machine utilizing photo-electric cells as the measuring means to locate the lines of fold.

A still further object of the invention is to provide a folding machine adapted to fold articles of various sizes successively and continuously without need for adjusting the folding means or the measuring means actuating such folding means. Other objects of the invention will in part be obvious and will in part appear hereinafter.

In the accompanying drawing, there has been disclosed a preferred embodiment of the invention but it will be understood that the invention is capable of further modification without departing from the scope thereof and it is not intended to limit the invention thereto.

Figure 2:
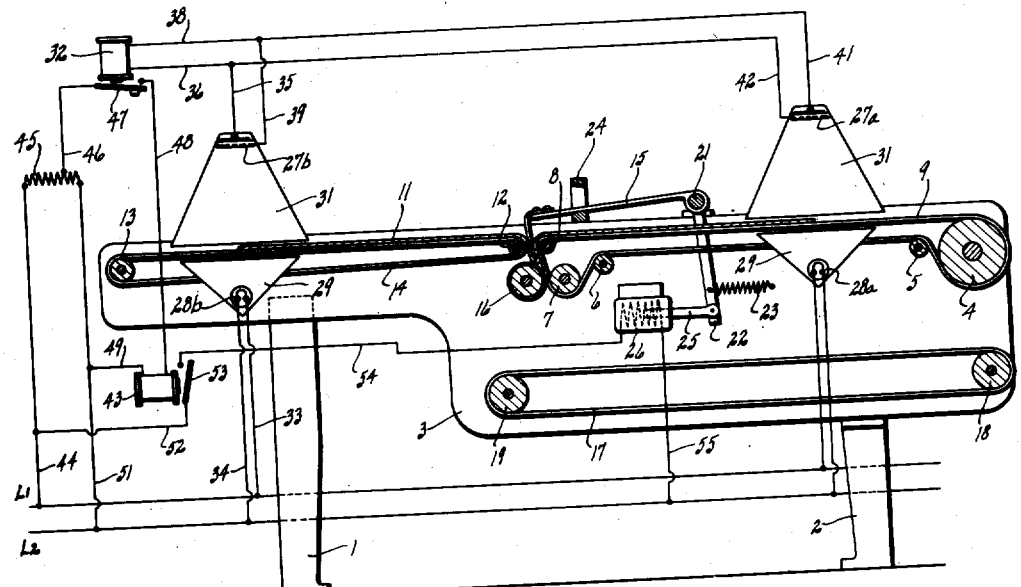
Figures 3, 4:
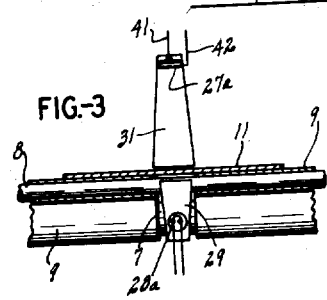

In said annexed drawing, Fig. 1 is a longitudinal section through a folding machine embodying the invention, with the folding blade in inoperative position; Fig. 2 is a similar view showing the folding blade in operation; Fig. 3 is a section taken along the line 3—3 of Fig. 1; and Fig. 4 is a detail view of a modified arrangement of light-sensitive cell and light source.

Referring to the drawing, standards 1 and 2 support the machine frame 3 in which are mounted a driven roller 4 and idler rollers 5, 6, 7, and 8, these rollers carrying conveyor ribbons or tapes 9. The roller 4 is driven from a motor, not shown, by suitable connecting means and conveys the work 11 from right to left, as seen in Fig. 1. Another driven roller 12 and an idler roller 13 support another work-conveying ribbon 14 positioned in line with ribbon 9 so as to receive work therefrom, the two ribbons being driven in synchronism.

An article of flatwork is thus conveyed along these ribbons and a folding blade 15 is mounted so as to thrust the article down between the small gap between the two ribbons and between a roller 16 and the ribbon 9 so that the article will be pulled between the roller and the ribbon and thus folded. The folded article drops onto a belt 17 mounted below the conveyor ribbons 9 and 14 and driven in the opposite direction thereto by driven roller 18 and idler roller 19. The belt 17 conveys the folded article to a stacking table or other collecting device.

The folding blade 15 is pivotally mounted at 21 and has an arm 22 to which one end of a spring 23 is attached, the other end of the spring being attached to the frame 3. This spring urges the folding blade into the downward or folding position, movement of the blade in either direction being limited by a stop 24. The armature 25 of solenoid 26 is also attached to the arm 22 and this solenoid maintains the folding blade in the upper position against the pull of the spring 23 when the solenoid is energized. This permits an article to pass under the folding blade and to extend along both of the conveyor ribbons 9 and 14 prior to folding.

It will be apparent that some means of timing the operation of the folding blade is necessary in order that it may be caused to move downward and fold the article only when the latter is properly positioned. While complex timing devices have been devised for this purpose, the present invention accomplishes the measuring or timing function by means of photo-electric cells 27a and 27b which are positioned to receive light from light sources 28a and 28b, the cells being located on one side of the upper run of the conveyor ribbons or tapes 9 and 14, which carry the article to be folded, and the light sources being located on the other side of such run. It will be obvious that either the cell or the light may be positioned above the article, the other of the two elements being positioned therebelow. Reflectors 29 are provided for reflecting the light from the sources 28 upwardly toward the ribbons or tapes, which are plural in number and have spaces between individual tapes to permit the passage of light. This light is received by concentrators 31 enclosing the cells 27 and directing the light onto the cells. It will be noted that one cell and associated light source is provided on each side of the folding blade 15. Each cell is connected to the same relay circuit but with opposed polarities so that, when no article is passing through the folding machine, the current from one cell will balance that from the other, the light reaching each cell being equal in intensity, and no current will flow, permitting the spring 23 to pull the folding blade into the downward position. If now, an article 11 is fed onto the conveyor 9, a portion of the light emitted by the source 28a is cut off and, since the light from the source 28b is not intercepted, an unbalanced condition will be set up in the circuit of relay 32 which causes energization of the solenoid 26 through appropriate electrical connections which will be described and the folding blade 15 is forced to the upper position illustrated in Fig. 1. This permits the article 11 to move under the blade and onto the tapes 14 until it begins to cut off the light from the source 28b. Since the two cells are so positioned that the trailing edge of the article will lie under one concentrator 31 while the leading edge lies under the other concentrator, forward movement of the article gradually cuts off more and more of the light reaching the second cell and begins to permit the passage of more and more light to the first cell. Eventually a condition is reached where the light reaching both cells is the same in quantity and a balanced condition is again set up in the relay circuit 32. When this occurs, the solenoid 26 is again deenergized and the spring 23 pulls the folding blade 15 down to fold the article by thrusting it between roller 18 and tapes 9. It will be observed that this action occurs when the article is equally spaced between the two cells and permits the passage of equal amounts of light and, since the folding blade is situated equidistant between the cells, the article will be centrally folded.

Articles of varying lengths can thus be folded centrally by extending the reflectors 29 and the concentrators 31 longitudinally of the conveyor tapes, the system being sensitive to any article which is of such length that its leading and trailing edges will be in the zones defined by the front and rear reflectors and concentrators, respectively, at the same time. The versatility of the apparatus in this respect can be increased by increasing the longitudinal dimensions of the cell units. Adjustment can also be made to take care of articles of varying sizes by moving the light-sensitive units closer to or farther away from the center point at which the folding blade operates.

The electrical circuits for the apparatus are as follows: Current to the lamps 28a and 28b flows from service line L1 through line 33 to the lamp and through line 34 to the other side L2 of the service line. The circuit to the other lamp is similar, being connected in parallel to the first lamp so that, the characteristics of the lamps being the same, each will receive the same current and will emit the same quantity of light.

The circuit for the sensitive tube 27b is from the positive side of the tube through the line 35, through line 36 to the coil of the relay 32, line 38 and line 39 to the negative side of the tube. The circuit for the sensitive tube 27a is from the positive side of the tube through line 41 and line 38, through the coil of the sensitive relay 32, line 36 and line 42 to the negative side of the tube. It will be noted that the two photo-electric cells or tubes are so connected that the positive side of one tube is connected to the negative side of the other, both circuits feeding the coil of the sensitive relay, and it is thus possible to balance the current from one cell against that of the other to render the relay 32 inoperative when both tubes receive the same quantity of light of the same intensity.

The currents thus set up are, as is well known, very weak, and it is necessary to utilize the effect to control stronger currents in order to operate the folding blade. Accordingly, an operating relay 43 is provided which is energized from service line L1 through the line 44, resistance 45, through line 46, contact arm 47, adapted to be closed by the sensitive relay 32, line 48 through the coil of operating relay 43, line 49, line 51 to service line L2. The resistance 45 is provided between the lines 44 and 51 to insure a low voltage across the contact of the sensitive relay 32.

This operating relay operates the solenoid 26 through the following circuit: From service line L1 through line 44, line 52 across contact 53, actuated by operating relay 43, through the line 54, through the solenoid 26 and the line 55 to L2.

In the operation of the device, a piece 11 to be folded enters in at the feed end of the machine and travels along the conveyor 9 and begins to intercept the light flowing from the lamp 28a to the sensitive tube 27a. When this occurs, the amount of current generated by the tube decreases, and the balance between the two currents flowing from the two tubes respectively, and which has been equal in quantity but opposite in polarity, is overcome. The current from cell or tube 27b, now not being balanced by the current from the other tube, operates the sensitive rellay 32 which closes the circuit of operating relay 43 and this, in turn, closes the service line circuit to the solenoid 26. The solenoid thereupon draws the armature 25 to the left, as seen in Fig. 1, against the pull of the spring 23, and lifts the folding blade 15. The piece continues its travel and is enabled to pass under the raised blade since this latter remains raised while the article continues to cut off the light from the lamp 28a. When it has reached the conveyor tapes 14, its leading edge soon enters the zone of the concentrator or accumulator 31 serving the other sensitive tube 27b and commences to cut off the flow of light thereto from the lamp 28b. At the same time, the positions of the two sensitive cell units have been so chosen and the length of the concentrators or accumulators 31 so devised that the trailing edge of the article commences to clear the zone of the cell 27a. In a short time, the article is covering an equal area in the two units or, in other words, is admitting an equal amount of light to each of the cells. When this occurs, the conditions prevailing before the article was passed through are, in effect, restored. That is, each cell is again receiving the same amount of light and a balance is restored in the circuit to the sensitive relay 32, which both cells feed, and, since the currents generated by each cell are of opposite polarity, no current flows through the sensitive relay and the contact 47 drops. This opens the operating relay 43 which, in turn, opens the solenoid circuit and the spring 23 can now pull the folding blade downward. The blade pushes the article between the roller 16 and the tapes 9, as may be seen in Fig. 2, to fold the article and the latter drops onto the belt 17 which conveys it to a stacking point. Since the article will be pulled off the tapes 9 and 14 at an equal rate during the folding operation, the condition of balance in the sensitive relay circuit will not be disturbed. When the article has been completely removed, the two cells again receive all of the light from their respective lamps, the condition of balance is maintained and the folding blade remains in the downward position until another article is passed through the folding machine.

The condition of balance between the two opposed currents from the sensitive tubes or cells depends solely on the amount of light getting through from the light sources to the cells and, consequently, it is immaterial how much or how little of the light from each cell is cut off by the article in position for folding, provided only that this is the same for each cell. A shorter article will intercept a smaller amount of light and a larger article will intercept a greater amount. The machine will fold either the short or the long article centrally and accurately when the condition is fulfilled that the leading edge of the article lies in the zone of one cell at the same time that the trailing edge lies in the zone of the other cell. The range of the machine can be increased by lengthening the concentrators or accumulators 31, these elements having an elongated shape as may be seen in Figs. 1 or 2 taken in connection with Fig. 3. Practically, the machine may be set up to fold any length of article presented by commercial sheets, these ranging in size from a minimum length of 80 inches to a maximum length of 108 inches. Thus, the machine may be constructed to take a piece having a maximum length of approximately 120 inches and a piece having a minimum length of approximately 70 inches. Changes in this capacity can be made by lengthening the concentrators or a machine with concentrators of a given size may be adapted to fold articles of greater or lesser lengths by moving the light-sensitive units toward or away from each other.

While the invention has been described in connection with a construction in which the light-sensitive cells are mounted below the article to be folded and the lamps above the article to be folded, it is possible to reverse the positions of these two elements and also, while the folding blade has been shown positioned above the article, it will be obvious that it may also be placed below such article or in any other position without altering the principle involved.

The invention may also be carried out by placing the light source and the sensitive cell on the same side of the article to be folded, as shown in Fig. 4 of the drawing. In this modification, the reflector 20 has been omitted and both the light-sensitive tube 27' and the lamp 28' have been placed on the same side of the flat article 11 in an accumulator 31'. A reflector 56 is placed over the lamp to prevent direct passage of the light rays to the cell. Consequently, the light is thrown down upon the article 11 and is reflected upward again to the surfaces of the accumulator 31' and eventually to the cell 27'. The principle here involved is the same as that described above but the amount of light reaching the sensitive cell will increase as the article 11 passes thereunder instead of decreasing as the article proceeds. Since the article to be laundered is usually white and reflects light very well, this is readily accomplished and the effect may be enhanced by making the conveyor tapes of a dark color so as to reflect but little light to the cell. With two of these modified light-sensitive units positioned as in Figs. 1 and 2, the effect will be the same since a condition of balance will prevail when the article is centrally positioned between the two cell units and will be disturbed in any other position of the article with corresponding effect on the folding blade.

What I claim is:

1. A folding machine comprising article-conveying means, article-folding means, light-sensitive means positioned so as to be affected by the passage of an article along said conveying means, and means actuated by said light-sensitive means for controlling the operation of said folding means.

2. A folding machine comprising article-conveying means, folding means, a plurality of light-sensitive means positioned in spaced relation along said article conveying means in position to be affected by the passage of an article thereabove, and means actuated by said light-sensitive means for controlling the operation of said folding means.

3. A folding machine comprising article-conveying means, article-folding means, photo-electric cells positioned along said conveying means on each side of said folding means and so as to be affected by the passage of an article along said conveying means, and means actuated by said cells for controlling the operation of said folding means.

4. A folding machine comprising article-conveying means, article-folding means, photo-electric cells positioned along said conveying means on each side of said folding means and spaced so that the leading and trailing edges of an article to be folded lie simultaneously in the light beams of the respective cells, and means actuated by said cells for controlling the operation of said folding means.

5. A folding machine comprising article-conveying means, article-folding means, photo-electric cells positioned along said conveying means and equally spaced from said folding means on each side thereof, and means actuated by said cells for controlling the operation of said folding means to fold an article along its center line.

6. A folding machine comprising article-conveying means, article-folding means, photo-electric cells positioned along said conveying means on each side of said folding means and spaced so that the leading and trailing edges of an article to be folded lie simultaneously in the light beams of the respective cells, a relay connected to both of said cells and adapted to operate when said cells receive unequal amounts of light, and means actuated through said relay for operating said folding means.

7. A device of the character described comprising means for moving an article along a path, a plurality of light-sensitive means capable of generating an electric current positioned adjacent said path so that light passing thereto is intercepted by an article, and a relay electrically connected to said light-sensitive means which operates when the light reaching two of the light-sensitive means differs in amount, and means adapted to be actuated by said relay.

8. A device of the character described comprising a plurality of spaced light-sensitive means capable of generating an electric current, electrically actuated means connected to each of said light-sensitive means in such manner that the current from one light-sensitive means opposes that from another, and means adapted to be actuated by said electrically actuated means when the amounts of current generated by two of the light-sensitive means are unequal.

WILLIAM P. BEATTIE.

DISCLAIMER 2,072,937.—*William P. Beattie*, Norwood, Ohio. ELECTRICAL MEASURING MEANS. Patent dated March 9, 1937. Disclaimer filed June 24, 1938, by the assignee, *The American Laundry Machinery Company*.
Hereby enters this disclaimer to claim 8 of said specification.
[*Official Gazette July 19, 1938.*]

tric cells positioned along said conveying means on each side of said folding means and spaced so that the leading and trailing edges of an article to be folded lie simultaneously in the light beams of the respective cells, a relay connected to both of said cells and adapted to operate when said cells receive unequal amounts of light, and means actuated through said relay for operating said folding means.

7. A device of the character described comprising means for moving an article along a path, a plurality of light-sensitive means capable of generating an electric current positioned adjacent said path so that light passing thereto is intercepted by an article, and a relay electrically connected to said light-sensitive means which operates when the light reaching two of the light-sensitive means differs in amount, and means adapted to be actuated by said relay.

8. A device of the character described comprising a plurality of spaced light-sensitive means capable of generating an electric current, electrically actuated means connected to each of said light-sensitive means in such manner that the current from one light-sensitive means opposes that from another, and means adapted to be actuated by said electrically actuated means when the amounts of current generated by two of the light-sensitive means are unequal.

WILLIAM P. BEATTIE.

DISCLAIMER 2,072,937.—*William P. Beattie*, Norwood, Ohio. ELECTRICAL MEASURING MEANS. Patent dated March 9, 1937. Disclaimer filed June 24, 1938, by the assignee, *The American Laundry Machinery Company*.

Hereby enters this disclaimer to claim 8 of said specification.

[*Official Gazette July 19, 1938.*]

DISCLAIMER 2,072,937.—*William P. Beattie*, Norwood, Ohio. ELECTRICAL MEASURING MEANS.
Patent dated March 9, 1937. Disclaimer filed June 24, 1938, by the assignee, *The American Laundry Machinery Company*.
Hereby enters this disclaimer to claim 8 of said specification.
[*Official Gazette July 19, 1938.*]